United States Patent
Weimer et al.

(10) Patent No.: US 6,872,378 B2
(45) Date of Patent: Mar. 29, 2005

(54) SOLAR THERMAL AEROSOL FLOW REACTION PROCESS

(75) Inventors: Alan W. Weimer, Niwot, CO (US); Jaimee K. Dahl, Superior, CO (US); J. Roland Pitts, Lakewood, CO (US); Allan A. Lewandowski, Evergreen, CO (US); Carl Bingham, Lakewood, CO (US); Joseph R. Tamburini, San Jose, CA (US)

(73) Assignee: Midwest Research Institute, Kansas City, MO (US)

( * ) Notice: Subject to any disclaimer, the term of this patent is extended or adjusted under 35 U.S.C. 154(b) by 0 days.

(21) Appl. No.: 10/239,706
(22) PCT Filed: May 8, 2001
(86) PCT No.: PCT/US01/15160
§ 371 (c)(1),
(2), (4) Date: Feb. 24, 2003
(87) PCT Pub. No.: WO03/049853
PCT Pub. Date: Jun. 19, 2003

(65) Prior Publication Data
US 2003/0208959 A1 Nov. 13, 2003

Related U.S. Application Data
(60) Provisional application No. 60/203,186, filed on May 8, 2000.

(51) Int. Cl.$^7$ .................................................. C01B 3/26
(52) U.S. Cl. ........................ 423/650; 48/198.2; 252/373
(58) Field of Search ........................... 48/198.2, DIG. 9; 252/373; 423/648.1, 650

(56) References Cited

U.S. PATENT DOCUMENTS

| | | | | |
|---|---|---|---|---|
| 4,229,184 A | * | 10/1980 | Gregg | ........................ 48/62 R |
| 4,290,779 A | | 9/1981 | Quader | |
| 4,552,741 A | | 11/1985 | Melchior | |
| 4,668,494 A | | 5/1987 | Van Hook | |
| 5,647,877 A | | 7/1997 | Epstein | |

FOREIGN PATENT DOCUMENTS

| | | |
|---|---|---|
| DE | 39 33 285 A1 | 4/1991 |
| EP | 0 675 075 A1 | 2/1995 |
| EP | 0 953 543 A2 | 3/1999 |

OTHER PUBLICATIONS

International Search Report of PCT/US01/15160.
Solar Energy Materials, (1991) XP000257324 A publication by Elsevier Science Publishers by Buck et al., titled, "Carbon Dioxide Reforming of Methane in a Solar Volumetric Receiver/Reactor: The Caesar Project*,", pp. 449–463.

* cited by examiner

Primary Examiner—Stanley S. Silverman
Assistant Examiner—Maribel Medina
(74) Attorney, Agent, or Firm—Paul J. White

(57) ABSTRACT

The present invention provides an environmentally beneficial process using concentrated sunlight to heat radiation absorbing particles to carry out highly endothermic gas phase chemical reactions ultimately resulting in the production of hydrogen or hydrogen synthesis gases.

24 Claims, 8 Drawing Sheets

PROCESS SCHEMATIC

| EXAMPLE # | QUARTZ TUBE DIA. (mm) | GRAPHITE TUBE DIA. (mm) | GRAPHITE TUBE LENGTH (mm) | REACTANT GAS FLOW (slm) | REACTANT GAS COMPOSITION (%CH4) | ANNULAR ARGON "PURGE" FLOW (SLM) |
|---|---|---|---|---|---|---|
| 1 | 25 | 6 | 152 | 0.2 | 5 | 2 |
| 2 | 25 | 6 | 152 | 0.2 | 5 | 2 |
| 3 | 25 | 6 | 152 | 0.2 | 10 | 1 |
| 4 | 25 | 6 | 152 | 0.2 | 10 | 1 |
| 5 | 25 | 6 | 152 | 0.2 | 10 | 1 |
| 6 | 25 | 6 | 152 | 0.2 | 10 | 1 |
| 7 | 25 | 6 | 152 | 0.2 | 5 | 2 |
| 8 | 25 | 6 | 152 | 0.2 | 5 | 2 |
| 9 | 25 | 6 | 152 | 0.2 | 5 | 2 |
| 10 | 25 | 6 | 152 | 0.2 | 5 | 2 |
| 11 | 25 | 6 | 152 | 0.2 | 5 | 2 |
| 12 | 25 | 6 | 152 | 0.2 | 5 | 2 |
| 13 | 25 | 6 | 152 | 0.1 | 5 | 2 |
| 14 | 25 | 10 | 152 | 0.3 | 10 | 3 |
| 15 | 25 | 10 | 152 | 0.3 | 10 | 3 |
| 16 | 25 | 10 | 152 | 0.3 | 10 | 3 |
| 17 | 76 | 6 | 152 | 0.3 | 5 | 1.2 |
| 18 | 76 | 6 | 152 | 0.3 | 5 | 1.2 |
| 19 | 76 | 6 | 152 | 0.3 | 5 | 1.2 |
| 20 | 76 | 6 | 152 | 0.3 | 5 | 1.2 |
| 21 | 76 | 6 | 152 | 0.3 | 5 | 1.2 |
| 22 | 76 | 6 | 152 | 0.3 | 5 | 1.2 |
| 23 | 76 | 6 | 152 | 0.3 | 5 | 1.2 |
| 24 | 25 | 10 | 305 | 0.3 | 10 | 3 |

TABLE 1

| FIG. 7A | FIG. 7B |
|---|---|

| OVERALL FEED GAS (%) | PARTICLE FEED RATE (g/min) | SOLAR FLUX (kW/m2) | TEMPERATURE (K) | RESIDENCE TIME (S) | MEASURED % H2 | % CH4 CONVERSION |
|---|---|---|---|---|---|---|
| 0.45 | 0.1 | 1200 | 1550 | 0.019 | 0.27 | 30 |
| 0.45 | 0 | 1200 | 1550 | 0.019 | 0.16 | 18 |
| 1.67 | 0 | 1170 | 1550 | 0.019 | 0.24 | 7 |
| 1.67 | 0 | 1780 | 1730 | 0.017 | 1.28 | 38 |
| 1.67 | 0 | 2060 | 1820 | 0.016 | 1.44 | 43 |
| 1.67 | 0 | 2350 | 1900 | 0.015 | 1.55 | 47 |
| 0.45 | 0 | 1000 | 1480 | 0.020 | 0.1 | 11 |
| 0.45 | 0 | 1280 | 1570 | 0.018 | 0.19 | 21 |
| 0.45 | 0 | 1480 | 1630 | 0.018 | 0.31 | 34 |
| 0.45 | 0 | 1730 | 1725 | 0.017 | 0.41 | 45 |
| 0.45 | 0.1 | 2430 | 1915 | 0.015 | 0.55 | 61 |
| 0.45 | 0 | 2400 | 1910 | 0.015 | 0.33 | 36 |
| 0.24 | 0.1 | 2430 | 1915 | 0.030 | 0.4 | 84 |
| 0.91 | 0 | 1523 | 1650 | 0.064 | 0.54 | 30 |
| 0.91 | 0 | 1700 | 1710 | 0.061 | 0.83 | 46 |
| 0.91 | 0 | 1900 | 1770 | 0.059 | 1.14 | 63 |
| 1 | 0 | 1000 | 1480 | 0.013 | 0.11 | 6 |
| 1 | 0 | 1240 | 1560 | 0.012 | 0.17 | 9 |
| 1 | 0 | 1500 | 1645 | 0.012 | 0.36 | 18 |
| 1 | 0 | 1750 | 1725 | 0.011 | 0.67 | 34 |
| 1 | 0 | 2000 | 1795 | 0.011 | 0.77 | 39 |
| 1 | 0 | 2230 | 1860 | 0.010 | 0.8 | 40 |
| 1 | 0 | 2540 | 1955 | 0.010 | 0.85 | 43 |
| 0.91 | 0 | 2140 | 1835 | 0.057 | 1.04 | 58 |

TABLE 1

FIG. 7B

SOLAR THERMAL AEROSOL FLOW REACTION PROCESS

This application claims priority from U.S. Provisional Application Ser. No. 60/203,186, dated May 8, 2000.

CONTRACTUAL ORIGIN OF THE INVENTION

The United States Government has rights in this invention under Contract No. DE-AC3699GO10337 between the United States Department of Energy and the National Renewable Energy Laboratory, a division of the Midwest Research Institute.

TECHNICAL FIELD

The present invention relates to a solar thermal process for carrying out high temperature chemical reactions. More particularly, it relates to a rapid-heating, short residence-time solar thermal process for carrying out highly endothermic decomposition, "reforming," and reduction reactions to produce hydrogen or hydrogen containing synthesis gases.

BACKGROUND ART

The primary driver for the development of renewable energy strategies is current concern over the potential, irreversible environmental damage that may occur with the continued or accelerated use of fossil fuels. In addition, the presently usable supply of fossil fuels is limited. Roughly 25% of all natural gas reserves are contaminated by carbon dioxide ($CO_2$) and cannot be economically developed for use in existing pipeline systems. Hydrogen sulfide ($H_2S$) is also a common component of natural gas, and it is highly toxic and corrosive to pipelines and gas processing equipment.

Movement toward a hydrogen based economy is an essential aspect of the United States' program to address the concern over environmental damage, as well as concerns over pollution in cities and associated health costs. However, current methods for producing hydrogen incur a large environmental liability, because fossil fuels are burned to supply the energy to reform natural gas (primarily methane, $CH_4$) to produce hydrogen ($H_2$).

High temperatures are required for producing hydrogen and synthesis gas, a combination of carbon monoxide (CO) and $H_2$, from carbon-containing reactants. For example, $H_2$ is produced at high purity by the direct thermal dissociation of methane.

$$CH_4 + Heat \rightarrow C + 2H_2 \quad (1)$$

at temperatures above approximately 1500° K. $H_2$ can also be produced by the direct thermal dissociation of $H_2S$.

$$H_2S + Heat \rightarrow H_2 + S \quad (2)$$

Synthesis gas can also be produced by the "dry reforming" of methane

$$CO_2 + CH_4 + heat \rightarrow 2CO + 2H_2 \quad (3)$$

or the carbon reduction of water

$$C + H_2O + heat \rightarrow CO + H_2. \quad (4)$$

Reaction (3) has the added benefit of potentially using sequestered $CO_2$ to produce synthesis gas. Thus, an opportunity exists for using natural gas containing relatively high concentrations of $CO_2$ and $H_2S$ as a precursor to synthesis gas.

Reactions (1–4) are typically not carried out separately in industry because the high temperatures require substantial energy input. Rather, they are usually coupled with fuel combustion reactions used to provide the required energy. For example, Matovich et al. (U.S. Pat. No. 4,095,974) describes an electrically heated high temperature aerosol reactor and process for carrying out reaction (1). However, the Matovich et al. process and others rely on conventional sources of heat and undesirable greenhouse gases that contribute to global warming, such as $CO_2$, that are ultimately produced at the power plant or directly in the combustion zone of the reaction tube.

Matovich et al. includes results from a pilot plant scale demonstration that $CH_4$ can be completely dissociated using a short residence time (fractions of a second to seconds) electrically heated aerosol flow reactor for temperatures greater than 2088° K. However, at a larger scale, the process is uneconomical and contributes to global warming due to high electricity costs and the generation of $CO_2$ via the burning of carbonaceous fuels to produce the electricity.

Hence, there is a need to develop environmentally benign processes for the production of $H_2$ or synthesis gas to be used as a "clean fuel" or as a precursor to chemicals, respectively. There is also a need to utilize known natural gas reserves containing high concentrations of $CO_2$.

BRIEF DESCRIPTION OF DRAWINGS

FIG. 7B is the remaining portion of Table 1 showing data from all 24 examples in columns 7 thru 13.

BEST MODE FOR CARRYING OUT THE INVENTION

It is a feature of the present invention to provide a method for carrying out high temperature chemical reactions.

It is an additional feature of the present invention to provide a method for carrying out high temperature chemical reactions requiring rapid-heating and short residence time.

It is still an additional feature of the present invention to provide a method for carrying out high temperature chemical reactions requiring rapid-heating and short residence time using renewable energy.

It is a further feature of the present invention to provide a method for carrying out high temperature chemical reactions requiring rapid-heating and short residence time using solar energy.

It is still a further feature of the present invention to provide a method for carrying out high temperature chemical reactions to produce hydrogen or hydrogen containing synthesis gases.

It is another feature of the present invention to provide a method for utilizing known natural gas reserves containing high concentrations of $CO_2$.

It is still another feature of the present invention to provide a method for utilizing known natural gas reserves containing high concentrations of $H_2S$.

It is yet another feature of the present invention to provide a method for carrying out high temperature dissociation reactions which produce carbon black in situ.

There is an enormous environmental benefit for carrying out reactions (1–4) directly without the combustion of carbonaceous fuels. Thus, the present invention provides a cost-effective, solar-based method of deriving hydrogen and synthesis gas from natural gas [reactions (1) and (3)], and it can be used with natural gas containing relatively high concentrations of $CO_2$ [reaction (3)] and/or $H_2S$ [reaction (2)]. The present invention also provides a method of deriving synthesis gas via carbon reduction of water [reaction (4)]. The process does not result in increased environmental damage due to burning of fossil fuels. Indeed, it represents a route for using current natural gas reserves that fixes carbon as well as increasing the energy content of the fuel. Furthermore, this method can be used with natural gas reserves that are contaminated by $CO_2$ and/or $H_2S$ and cannot presently be developed economically for use in our current pipeline systems.

Figure 1:
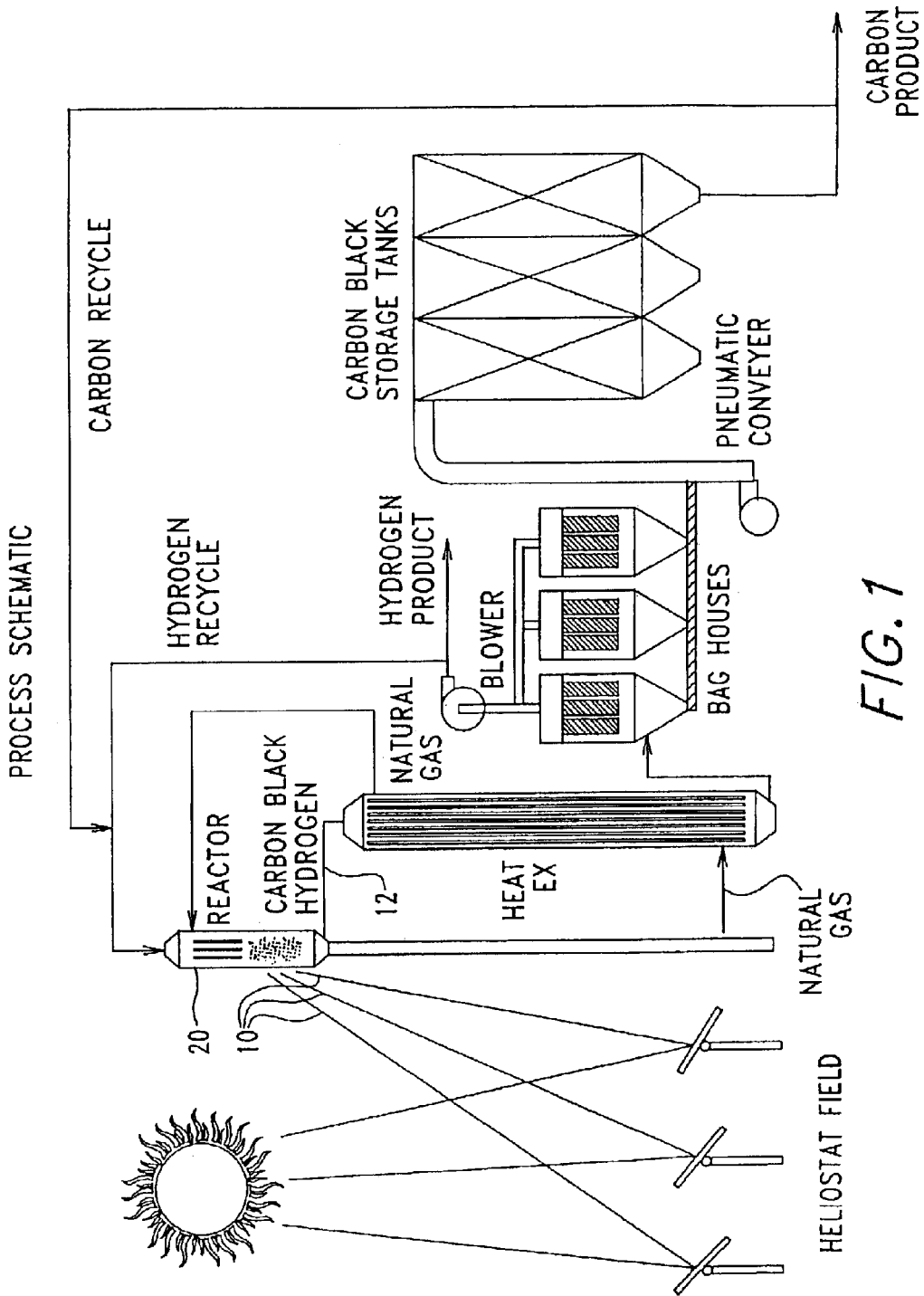
FIG. 1 is a schematic diagram showing one embodiment of the process of the present invention.
Figure 3:
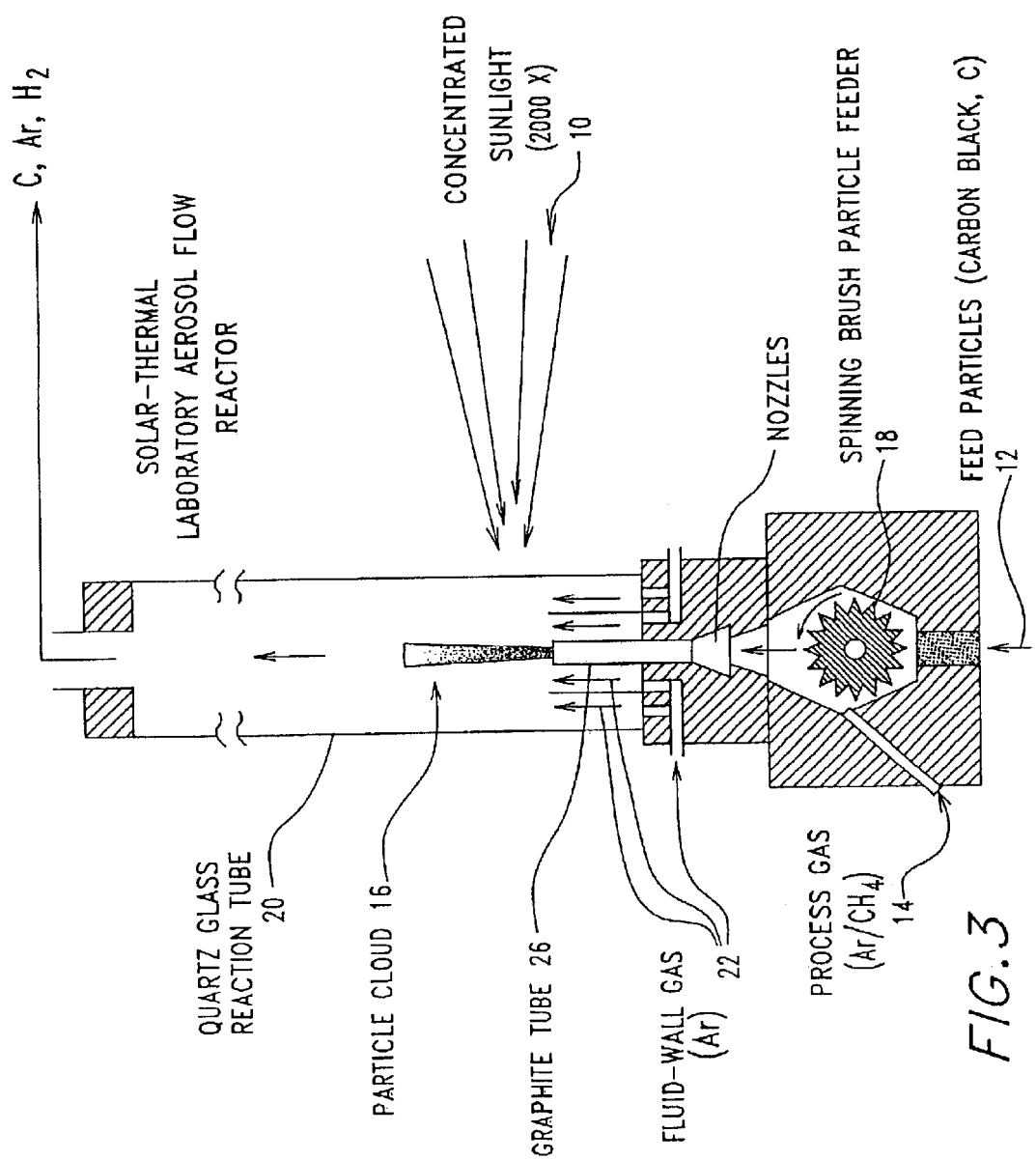
FIG. 3 and FIG. 6 are diagrams of the HFSF reactor modified for the process of the present invention.
Figure 6:
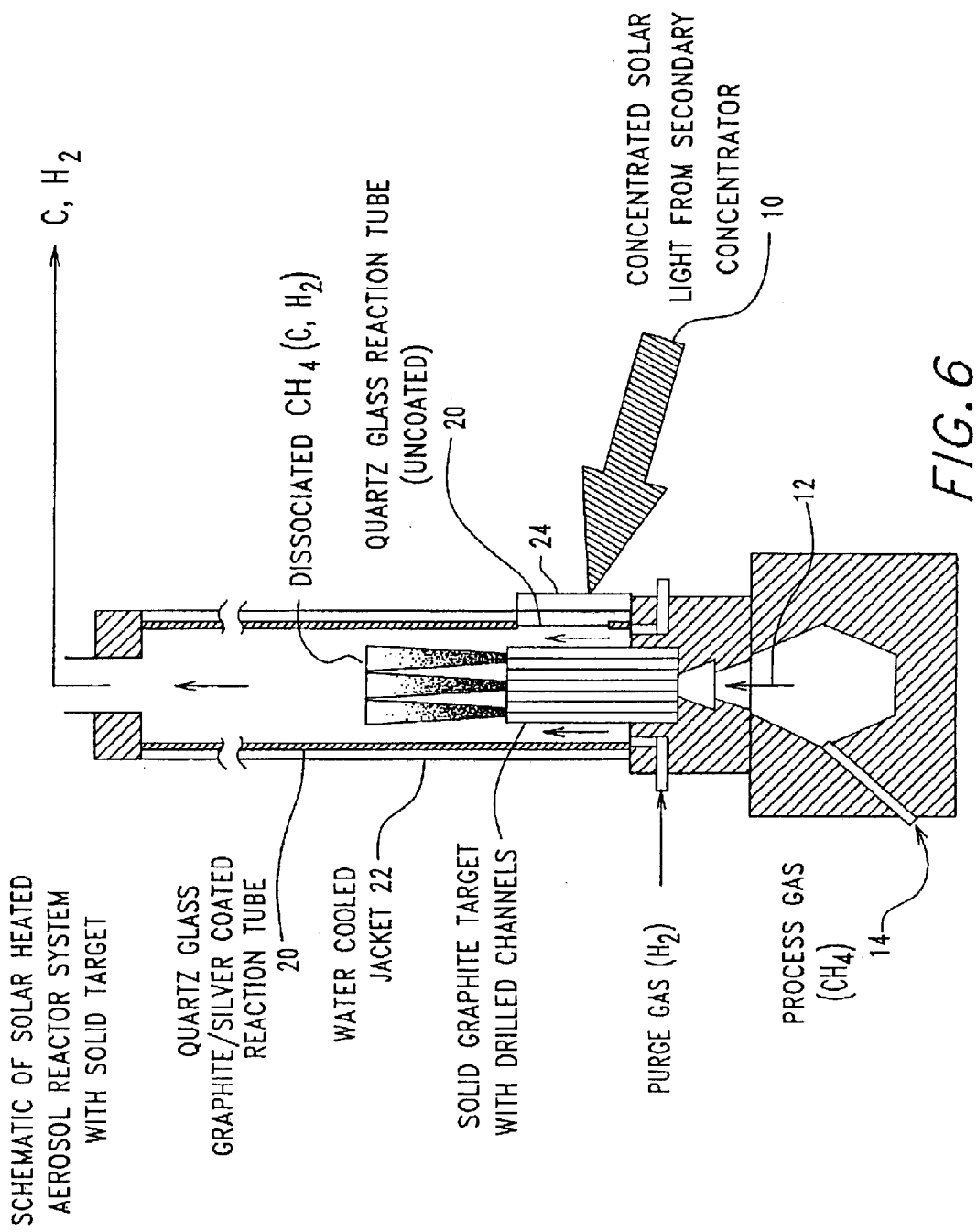
Figures 7A, 8:
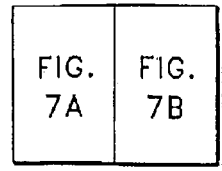
FIG. 7A is a first portion of Table 1 showing data from all 24 examples in the first 6 columns.
FIG. 8 shows that FIGS 7A and 7B when read side-by-side represents all of the data from Examples 1-24.

Referring now to FIGS. 1, 3 and 6, FIGS. 3 and 6 illustrate diagrams of the reactor portion of the entire process diagramed in FIG. 1. The process of the present invention uses concentrated sunlight 10 to transfer heat at extremely high rates by radiation heat transfer to inert radiation absorbing particles 12 flowing in dilute phase in process gas 14. The particles subsequently heat flowing gases by conduction, thereby providing the energy to carry out highly endothermic gas phase chemical reactions. The solar thermal coupling to flowing particles is necessary because the gases to be heated are themselves transparent to solar radiation. Preferably, the gases and the particles flow co-currently to maximize the temperature and heating rate of the gases. It is possible for the particles to either be fed into the process with the reactant gas or to be generated in-situ by the reaction itself. A process for carrying out reaction (1) is illustrated schematically in FIG. 1.

In accordance with the process of the present invention, the inert, radiation-absorbing particles 12 are heated directly by solar radiation, and they must be easily separated from the gas after processing. Typically, these radiation-absorbing particles are carbon black. As used herein, "direct" heating means that heating is by radiation, rather than by a hot gas. Preferably, the particles are fine, high purity carbon particles. Carbon black is chemically stable at extremely high temperatures and can be easily separated from the flowing process gas 14 using a filter and/or a cyclonic separator. Because carbon is produced according to reaction (1), it is compatible with the hydrocarbon decomposition type reactions to be carried out in the process for producing $H_2$. Preferred types of high purity carbon black are "Shawinigan™" sold by Chevron Chemical Company, produced by the decomposition of acetylene, and "Thermax™" sold by Canadian Carbon Company, produced by the decomposition of natural gas. More preferably, the particles comprise recycled carbon black synthesized according to reaction (1) in the process of the present invention. Most preferably, the particles are carbon black particles generated in-situ from the decomposition of a reactant gas.

In this manner, the carbon black particles can be produced in situ via dissociation reactions of natural gas, thereby eliminating the need to feed the particles into the reactor.

The radiation absorbing particles must be dispersed in the reactor apparatus, and the method of dispersion is important. The particles should flow as a dust or particle cloud 6 through the apparatus, dispersed in a dispersing process gas 14. They should have a fine primary particle size, preferably in the sub-micron size range, and be non-agglomerated, thus providing the highest surface area possible for solar radiation absorption. The particles can be dispersed mechanically, such as by shearing on the surface of a rotating drum or brush 18. Alternatively, the particles can be dispersed using the shear provided by high velocity gas exiting with the particles from a feed injection tube. Experience has shown that the exiting "tip speed" from the injection tube should be at least 10 m/s to provide the shear necessary for complete dispersion of fine powders. Particles generated in-situ are inherently well dispersed in the process.

The process gas 14 used for dispersing the particles must be compatible with the reaction process or easily separated after processing. Preferred dispersing process gases comprise $CH_4$, $H_2$, $CO$, or a combination thereof.

The flowing process gas stream 14 initially comprises at least one reactant selected from $CH_4$, $H_2S$, $CO_2$, and $H_2O$. It may also initially comprise a non-reactive gaseous component. For example, in lab-scale tests, methane was diluted with argon for safety reasons. As the gas stream is heated and the reaction or reactions occur, one or more product gases are added to the gas stream. These product gases comprise $H_2$ [reactions (1), (2), (3) and (4)] and, depending on the composition of the reactant gases, may also comprise $CO$ [reactions (3) and (4)]. In the case of reaction (1), additional carbon particles are also produced, and in the case of reaction (2), elemental sulfur is produced. A preferred reactant gas stream is natural gas or one containing natural gas.

In general, the radiation absorbing particles 12 flow co-currently, that is in the same direction with the flowing gas stream through a quartz glass reaction tube 20 to maximize heat transfer from the particles 12 to the gas 14. The tube 20 may be oriented horizontally or vertically. For the case of a vertical reaction tube process, the flow direction may be upward or downward. Upward flow guarantees that aggregated particles will not be carried through the reaction tube, and downward flow reduces the potential for plugging in the solids feed line. The preferred flow direction is downward with particles generated internally and separated downstream.

It is desirable to provide a gaseous fluid wall 22 adjacent the inner surface of the reaction tube 20 to prevent the accumulation of carbon on the tube wall. This is particularly true if the reaction tube 20 comprises a transparent material, such as quartz, as carbon deposits could cause the wall to overheat and melt. The fluid wall 22 should comprise a fluid that is compatible with the reactants and the products, i.e., that will not interfere with the reaction or be difficult to separate from the gas stream exiting the reaction tube. The fluid wall 22 gas is preferentially a product of the reaction being carried out. $H_2$ is a preferred fluid wall gas when carrying out reaction (1) or (2). $H_2$, $CO$, or a mixture thereof is preferred for the fluid wall 22 when carrying out reactions (3) or (4).

Figure 5:
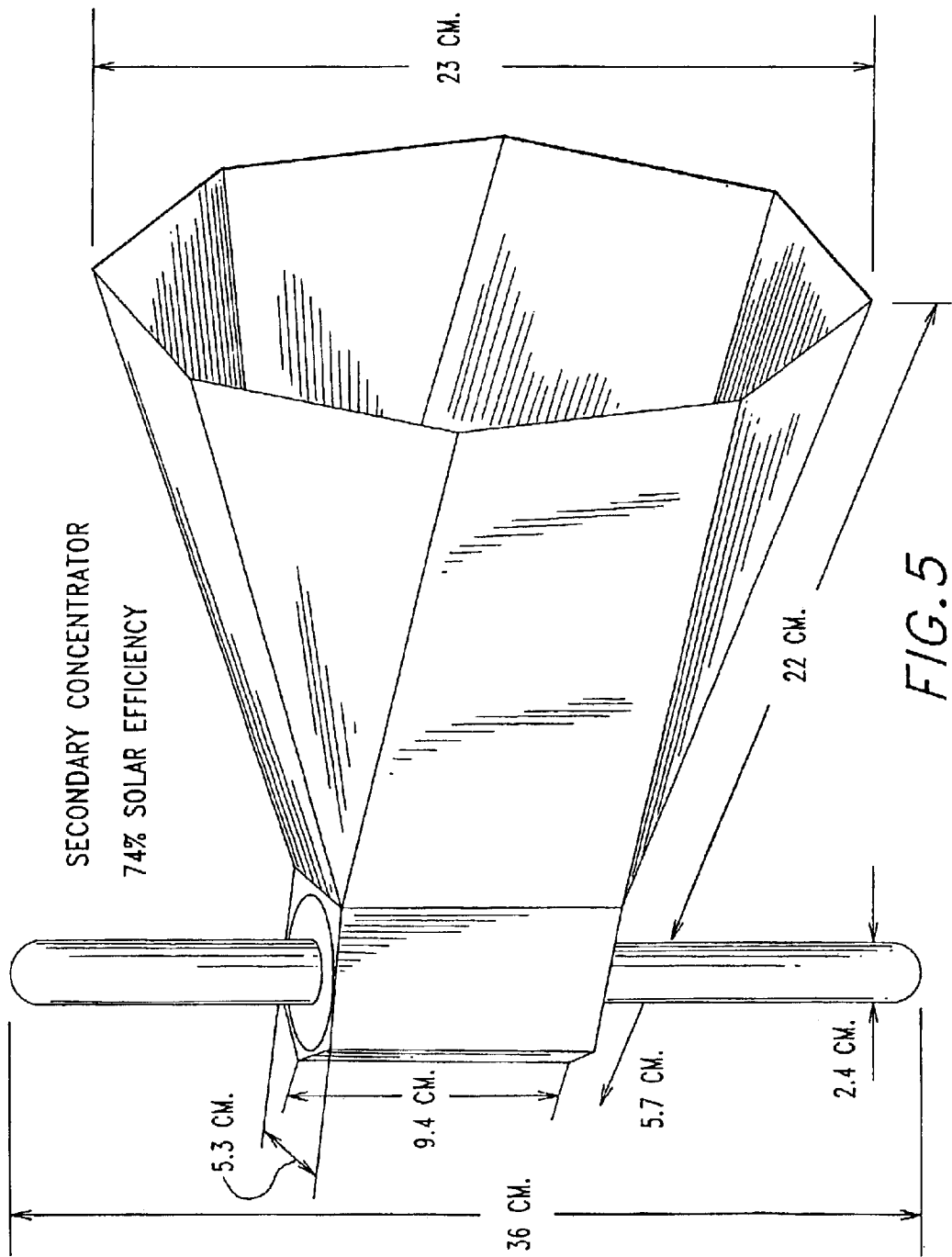
FIG. 5 is a schematic of a modified reactor assembly using a secondary concentrator.

The process of the present invention may be carried out using an apparatus comprising an aerosol flow reaction tube 20 coupled to a solar energy concentrator shown in FIG. 5. Preferably, the solar concentrator of the apparatus is designed to optimize the amount of solar thermal heating for the process. Solar fluxes between about 1500 and about 2000 kW/m² have been shown to be sufficient to heat the particles to temperatures between 1675° and 1875° K. More preferably, solar fluxes between about 2000 and 5000 kW/m² are desired to achieve even higher temperatures and reactor throughputs. Most preferably, reaction temperatures should exceed 2100° K.

The concentrated sunlight 10 can be provided in the form of a collimated beam (spot) source, a concentric annular source distributed circumferentially around the aerosol reaction tube, or in the form of a linearized slot source providing heating axially along the length of the aerosol reaction tube. The light can be redirected and focused or defocused with various optical components to provide the concentration on or in the reactor as required. An example of a suitable solar concentrator for use in the present invention is the HFSF at the National Renewable Energy Laboratory (NREL) in Golden, Colo., shown schematically in FIG. 2. The HFSF uses a series of mirrors, also known as the primary concentrator 30, that concentrate sunlight to an intensified focused beam at power levels of 10 kW into an approximate diameter of 10 cm. The HFSF can heat as fast as 1,000° K./second to up to 100,000,000° K./second. The HFSF is described in a payer by Lewandowski, Bingham, O'Gallagher, Winston and Sagie, entitled "Performance Characterization of the SERI Hi-Flux Solar Furnace," Solar Energy Materials 24 (1991), pp. 550–563. The furnace design is described starting at page 551, wherein is stated, "The performance objectives set for the HFSF resulted in a unique design. To enable support of varied research objectives, designers made the HFSF capable of achieving extremely high flux concentrations in a two-stage configuration and of generating a wide range of flux concentrations. A stationary focal point was mandatory because of the nature of many anticipated experiments. It was also desirable to move the focal point off axis. An off-axis system would allow for considerable flexibility in size and bulk of experiments and would eliminate blockage and consequent reduction in power.

In particular, achieving high flux concentration in a two-stage configuration [an imaging primary (concentrator 30) in conjunction with a nonimaging secondary concentrator] dictates a longer f/D (ratio of focal length to diameter) for the primary (concentrator 30) than for typical single-stage furnaces. Typical dish concentrators used in almost all existing solar furnaces are about f/D=0.6. To effectively achieve high flux concentration, a two-stage system must have an f/D=2. Values higher than this will not achieve significantly higher concentration due to increased losses in the secondary concentrator. Values lower than this will result in a reduction of maximum achievable two-stage flux. At low values of f/D, the single stage peak flux can be quite high, but the flux profiles are also very peaked and the average flux is relatively low. With a longer f/D, two-stage system, the average flux can be considerably higher than in any single-stage system. The final design of the HFSF has an effective f/D of 1.85. At this f/D, it was also possible to move the focal point considerably off axis (~30°) with very little degradation in system performance. This was because of the longer f/D and partly because of the multi-faceted design of the primary concentrator 30. This off-axis angle 35 allows the focal point and a large area around it to be completely removed from the beam between the heliostat [37] and the primary concentrator [30]."

Figure 2:
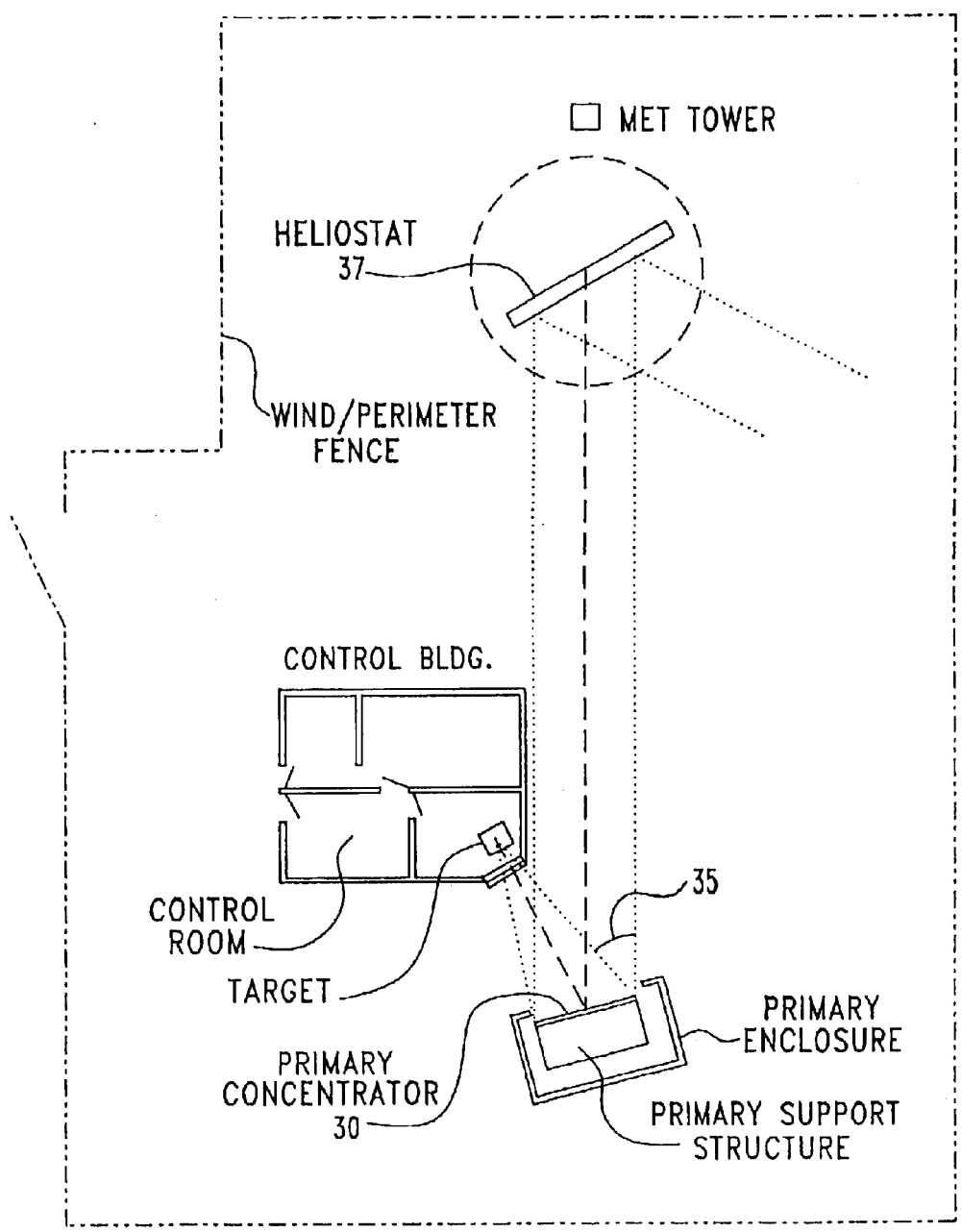
FIG. 2 is a schematic diagram of the High Flux Solar Furnace (HFSF) faciltiy.

A layout of the system is shown in FIG. 2.

The reaction tube 20 is adapted such that radiation absorbing particles 12 and gases 14 can flow through it, preferably in a co-current fashion. One such apparatus has been demonstrated at NREL, where concentrated sunlight from the HFSF has been used to achieve internal temperatures exceeding 3000° C. within water cooled quartz reaction tubes. The NREL apparatus has been used to vaporize internal graphite targets for the production of fullerenes, as described in U.S. Pat. No. 6,077,401, issued Jun. 20, 2000, "Fullerene Synthesis Using Highly Concentrated Solar Radiation," Clark Fields, J. Roland Pitts, David King, Mary Jane Hale, Carl Bingham, and Allan Lewandowski.

The reaction tube 20 can be made of any high temperature refractory material, such as graphite, that subsequently heats absorbing particles 12 flowing through it and is substantially chemically unreactive with the particles or the reactant or product gases 14. Solar thermal radiation heats the tube, and re-radiation from the internal wall of the refractory reaction tube 20 heats the absorber particles 12 flowing through it.

Referring to FIG. 6, the reaction tube 20 can be made of a high-temperature material, such as quartz, that is transparent or semi-transparent to the concentrated sunlight 10. The internal wall of the transparent reaction tube 20 may be coated with a reflective material, such as silver, or other like material, to keep the concentrated sunlight 10 inside the reactor. If such a reflective coating is used, there must be an uncoated transparent window or opening to allow the concentrated sunlight into the vessel. This is shown in FIG. 6. The tube wall transparent area 24, allowing for concentrated sunlight entry and subsequent solar thermal heating, should be selected to provide heating during the desired reaction residence time requirements for the process. The transparent area 24 may have a number of shapes including a circular spot, a concentric cylinder, or a linear slot along the axis of the tube 20.

The reaction tube 20 or tubes may be positioned vertically or horizontally, or in other spatial orientations within the reactor. For the case of a vertical reaction tube process, the apparatus may be arranged to provide upward or downward flow of the gas stream and the cloud of particles 16. Upward flow guarantees that aggregated particles 12 will not be carried through the reaction tube 20. Downward flow reduces the potential for plugging in the solids feed line.

The apparatus may also comprise multiple tubes 20, with an outer transparent tube surrounding an inner refractory tube. In this embodiment, the sunlight 10 passes through the outer tube and heats the inner refractory tube. Re-radiation of thermal energy from the internal wall of the inner refractory tube heats absorber particles flowing through the inner tube.

Because it is important that the particles are dispersed in the reactant gas stream, the apparatus also comprises a means for dispersing the particles. For example, the apparatus may include a rotatable drum or brush 18, shown in FIG. 3, from whose surface particles are sheared as the drum or brush rotates.

Alternatively, a feed injection tube can be provided that causes the particles to be dispersed by the shear of the high velocity gas exiting the feed injection tube. The feed injection tube should be oriented to provide sufficient shear for complete dispersion of the fine radiation absorbing particles. Experience has shown that the exiting "tip speed" from the injection tube should be at least 10 m/s. Also, the tube should be designed to minimize the quantity of gas required to disperse the particles, thereby providing the longest possible residence time within the aerosol reaction chamber.

The location of the solar thermal heating source relative to the tube 20 depends on tube wall locations that are designed to be free of solid deposits.

The reactor design preferably includes a gaseous fluid-wall 22 that prevents the buildup of particles along the wall of the reactor 20. The fluid wall 22 may be generated by flowing a compatible gas axially and concentrically along the wall to prevent the absorbing particles 12 from touching the wall. It is also feasible to flow gas radially inward through a porous wall in a manner that prevents absorbing particles from touching the wall. In general, the section of the wall most critical for eliminating buildup is that section transparent to the concentrated sunlight 10 providing the solar thermal driving force for the absorbing particles.

Carbon black particles 12 are preferably removed from the gas stream after the gas exits the reaction chamber, and they are preferably recycled in the process. The carbon black particles 12 may be removed from the gas stream by a suitable method known in the art, such as by filtration, cyclonic separation, or a combination thereof.

EXAMPLE 1

In accordance with the present invention, the NREL reactor apparatus developed for the synthesis of fullerenes was modified as shown in FIG. 3. A 25 mm quartz tube was positioned at the nominal focus of and normal to the optical axis of the HFSF with its axis "vertical," and with the ends of the tube extending beyond the limits of the concentrated solar flux provided by the HFSF. A 15.2 cm long×6 mm outer diameter graphite tube 26 with an inner diameter of 3 mm was positioned inside the quartz reaction tube 20. Shawinigan™ acetylene carbon black particles 12 were dispersed at a nominal rate of 0.1 grams per minute in a 5 volume % methane-in-argon reactant process gas 14 using a spinning brush particle feeder 18. The mixture containing the gas and the carbon particles was injected into the graphite tube 26 from bottom to top. The reactant process gas 14 was fed at a rate of 0.2 standard liters per minute (SLM) into the graphite reaction tube 26. A fluid wall 22 was created by injecting argon through channels into the annulus between the graphite tube and the quartz tube, as indicated by the parallel arrows in FIG. 3. The annular argon "purge" gas flowed at a rate of 2 SLM. The adjusted molar concentration of inlet $CH_4$ accounting for a combined reactant purge gas stream near the exit of the graphite reaction tube was 0.45%. The estimated flux of concentrated sunlight heating the graphite reaction tube 26 target was 1200 $kW/m^2$. A temperature of 1550° K. was measured inside the graphite tube 26 using a Type C thermocouple positioned in the center of the hot zone. The length of the hot zone was 50 mm long. The residence time of the methane in the hot zone of the reactor tube was 0.019 second. Any fed and synthesized carbon black 12 were separated downstream of the reactor using a HEPA filter. A calibrated thermal conductivity detector located downstream of the filter indicated a hydrogen concentration of 0.27 mole % $H_2$ in argon. This corresponded to a methane conversion to carbon and hydrogen of 30% according to reaction (1). This example indicates that concentrated sunlight can be used to provide energy for carrying out the endothermic reaction (1). Concentrated sunlight 10 is passed through an outer concentric quartz tube and heats the graphite reaction tube and its contents to reaction temperature and then drives the endothermic reaction, all within fractions of a second.

EXAMPLE 2

The process parameters used in Example 1 were repeated with the exception that no carbon particles were fed in the process. The product gas was measured by the calibrated thermal conductivity detector to have a hydrogen content of 0.16% $H_2$, corresponding to a reduced methane conversion of 18%. Carbon black produced according to reaction (1) was collected in a downstream filter and analyzed by transmission electron microscopy (TEM). The carbon black was amorphous and was comprised of carbon particles having a size in the range of 20 to 40 nanometers. This example indicated that the feeding of fine carbon black particles to the process (per Example 1) increases the conversion of the thermal dissociation of methane for low temperatures. This example also indicates that amorphous fine carbon black powder is produced in the process and provides an in-situ method of generating carbon black radiation absorbers in the reactor (without having to feed it).

EXAMPLES 3 TO 6 (Varying Solar Flux)

Figure 4:
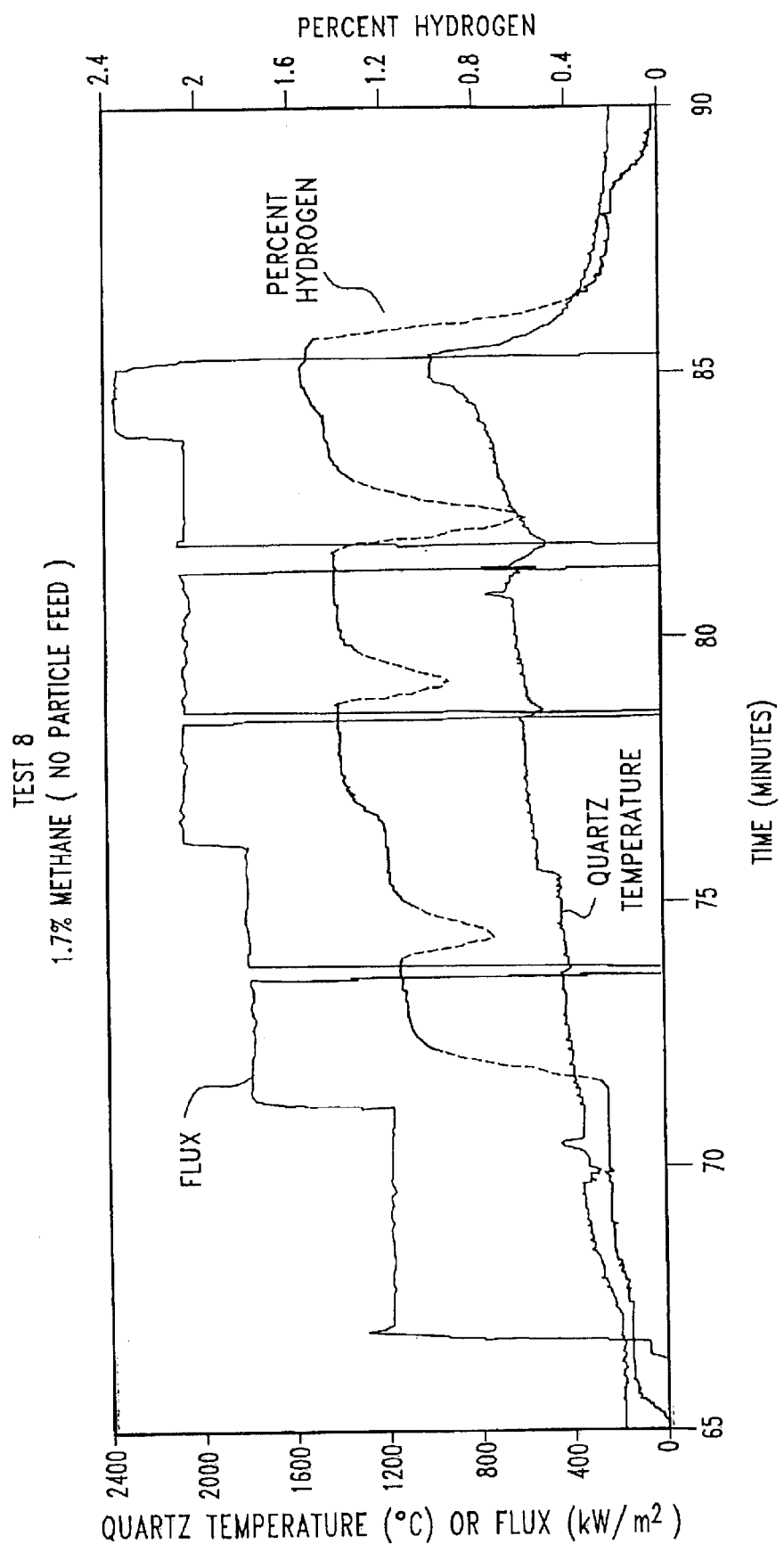
FIG. 4 is the response of the thermal conductivity analyzer to varying solar-flux on the outside reactor tube wall.

The apparatus described in Example 1 was used. The reactant gas flowed at a rate of 0.2 SLM and had a composition of 10 mole % $CH_4$ in argon. The annular "purge" argon flow rate was 1 SLM and no carbon particles were fed. The adjusted molar concentration of $CH_4$ accounting for a combined reactant purge gas stream near the exit of the graphite reaction tube was 1.67%. The estimated flux of concentrated sunlight heating the graphite reaction tube target was varied as 1170 $kW/m^2$, 1780 $kW/m^2$, 2060 $kW/m^2$, and 2350 $kW/m^2$ for Examples 3, 4, 5, and 6, respectively. The corresponding temperatures in the reaction tube were 1550, 1730, 1820, and 1900° K., respectively. The residence time varied in the range of 0.019 to 0.015 seconds. The response of the hydrogen content in the flowing product gas stream resulting from the solar flux changes is shown in FIG. 4. The conversion of methane according to reaction (1) was calculated from the measured concentration of $H_2$ and was 7%, 38%, 43%, and 47%, respectively. This set of examples indicates that an increase in the solar flux results in an increase in the thermal dissociation (conversion) of methane to $H_2$ and carbon black.

EXAMPLES 7 TO 10 (Varying Methane Concentration, Flow Rates, and Solar Flux)

A series of experiments similar to those presented in Examples 3 to 6 were carried out, but with slightly different gas flows, methane concentrations, and solar fluxes. Again, the extent of dissociation of the methane was dependent on the solar flux to the reaction tube.

EXAMPLES 11 TO 13 (High Solar Flux Experiments)

The process conditions of Example 1 were repeated with the exception that the solar flux was increased from 1200 $kW/m^2$ (Example 1) to 2430 $kW/m^2$ (Example 11). The temperature in the hot zone was measured to be 1915° K. (Example 11) compared to 1550° K. (Example 1). The resulting concentration of $H_2$ (0.55 mole %) indicated a methane dissociation of 61% according to reaction (1). This result indicates that the higher solar flux results in a higher degree of dissociation (conversion) of methane.

The process conditions of Example 11 were repeated, except that no carbon particles were fed to the reactor. The concentration of $H_2$ indicated that the dissociation of $CH_4$ was 36%. This Example 12 illustrates that a decrease in dissociation results when carbon particles are not co-fed in the process to improve heat transfer.

The process conditions of Example 11 were repeated except reactant gas flow was decreased to 0.1 SLM, resulting in an adjusted molar concentration of $CH_4$ accounting for a combined reactant purge gas stream near the exit of the graphite reaction tube of 0.24 mole %. A calculated residence time of 0.03 seconds resulted in a measured outlet hydrogen concentration of 0.4 mole % $H_2$ for a degree of dissociation of 84%. Example 13 shows that high conversions (extents of dissociation) can be achieved in hundredths of a second for high reactor temperatures (1915° K) obtained using concentrated solar-thermal heating.

EXAMPLES 14 TO 16 (Larger Graphite Tube)

The process conditions of Example 2 were repeated with the exception that a 10 mm outside diameter graphite tube was used and the annular argon "purge" gas flow rate was 3 SLM. An adjusted molar concentration of $CH_4$ accounting for a combined reactant purge gas stream near the exit of the graphite reaction tube was 0.91 mole %. The solar flux was 1523 kw/m² (Example 14), 1700 kW/m² (Example 15), and 1900 kW/m² (Example 16). The measured temperatures in the graphite reaction tube were 1650° K, 1710° K, and 1770° K and the corresponding reaction residence times were 0.064, 0.061, and 0.059 seconds, respectively. The concentrations of hydrogen determined from the thermal conductivity detector were 0.54 mole %, 0.83 moles %, and 1.14 mole %. During the course of the experiments, gas samples were taken in the outlet line and analyzed using an off-line gas chromatograph (GC). The following chemical compositions were determined: 0.65 mole % (Example 14), 0.85 mole % (Example 15), and 1.25 mole % (Example 16). The GC results corresponded to a methane dissociation of 35% (Example 14), 48% (Example 15), and 70% (Example 16) conversion. This set of experiments indicated that different sizes of graphite reaction tubes could be used and that the experimental results using the thermal conductivity analysis were validated with the off-line GC.

EXAMPLES 17 TO 23 (Larger Quartz Tube, Varying Solar Flux)

The processing conditions of Examples 14 to 16 were repeated with the exception that a 76 mm outside diameter external quartz tube was used, the graphite reaction tube was 6 mm outer diameter, the reactant gas composition was 5 mole % methane, and the annular argon purge flow was 1.2 SLM. The adjusted molar concentration of $CH_4$ accounting for a combined reactant purge gas stream near the exit of the graphite reaction tube was 1 mole %. The solar flux was varied at seven different intensities between 1000 and 2540 kW/m², with corresponding temperatures in the range of 1480 to 1955° K. The measured hydrogen content in the product gas for each of these conditions showed an increase in methane dissociation over a range of 6% to 43% for a solar flux of 1480 kW/m² to 1955 kW/m². This set of experiments indicated that different sizes of outer quartz protection tubes could be used and that the extent of dissociation increased with an increase in the solar-flux to the reaction tube.

EXAMPLE 24 (Isolated Reaction Tube Contents Design)

The reactor apparatus was modified so the graphite reaction tube extended over the entire length of the surrounding protective quartz tube. This design modification kept the reaction contents inside the graphite reaction tube and isolated the graphite reactor contents from the annular space between the graphite tube and the quartz protection tube. A non-oxidizing argon gas flowed in the annular space between the graphite reaction tube and the quartz protection tube to prevent oxidation of the graphite tube. The flow of this non-oxiziding gas also prevented any volatile species emanating from the graphite tube upon heating from depositing on the inside surface of the quartz protection tube. This design also prevented any deposition of carbon particles on the inside surface of the quartz protection tube. The concentrated sunlight passed through the protective quartz wall to the graphite tube outside wall where it heated the graphite tube to reaction temperature.

The outside quartz protection tube had an outside diameter of 25 mm and was 305 mm long. The inside graphite reaction tube had an outside diameter of 10 mm and was also 305 mm long. Inert argon gas flowed through the annular gas flow space at a rate of 3 SLM. Reactant gas comprising 10 mole % methane in argon flowed through the graphite reaction tube at a flow rate of 0.3 SLM. No carbon particles were fed during the run, but, instead were formed during the reaction and provided an in-situ method for providing radiation coupling to heat reactant gas during the processing. A solar flux of 2140 kW/m² was used to heat the graphite reacton tube to a temperature of 1835° K. The downstream thermal conductivity detector measured the concentration of hydrogen in the combined reaction product gas/annular "purge" gas stream to be 1.04 mole % $H_2$. The residence time in the hot zone of the reaction tube was 0.06 seconds. A 58% conversion of $CH_4$ to carbon black and $H_2$ was obtained. Inspection of the quartz wall after the run indicated no depositon of carbon black or other species.

This example indicates that the surface of the protective quartz wall can be kept clean by extending the graphite reaction tube along the entire length of the surrounding protective tube and isolating the reactor contents from the annular space between the concentric tubes. Data for the previous 24 examples can be found in Table 1.

EXAMPLE 25 (High Conversion Run with GC Analysis)

The apparatus of Example 24 was used. This experiment was run on a very clear day with direct normal irradiance at approximatley 1000 W/m². As used herein, "irradiance" is defined as the quantity of sunlight coming directly from the sun disk, measured within a cone angle of 5 degrees by a Normal Incidence Pyrrheliometer. The estimated flux on the target was about 2400 kW/m² or 2400 suns. The graphite reaction tube temperature was 1910° K.

The flow of annular "purge" argon gas was initiated at 2 SLM, then the particle feed and a 5 mole % methane-in-argon mixture (at a flow rate of 0.1 SLM) was started at about 4 minutes. The time delay for the flow to reach the hydrogen detector was about 20–30 seconds. The thermal conductivity of methane is higher than that of argon, indicated by a change in the apparent $H_2$ mole % trace. When the signal became steady, concentrated sunlight was introduced by opening a fast-acting shutter. A nearly immediate increase can be seen in the percent $H_2$ trace. The shutter was closed at about 11 minutes, corresponding to a decrease in the $H_2$ signal at about 11 minutes. At 16 minutes of elapsed time, the flow of methane-in-argon was stopped, then restarted, stoped again, and restarted at 0.2 SLM at 18 minutes elapsed time. The changes in the $H_2$ signal clearly indicate that the hydrogen production is following these flow manipulaitons. A sample bag was filled for subsequent analysis during the interval between about 20 and 25 minutes. The shutter was closed at about 27 minutes.

The gas sample was analyzed by GC and found to be comprised of 0.813 mole % $H_2$, 183 parts per million (ppm)

$CH_4$, 523 ppm $C_2H_4$, 183 ppm $C_2H_2$, and the balance (99.4 mole %) argon. For the flow rates of methane and argon in this experiment, complete conversion of methane to hydrogen would have resulted in 0.91 mole % $H_2$. Thus, the measured conversion of methane was about 88%. Inspection of the quartz tube wall indicated that no deposition of carbon black or volatile species occurred.

This example demonstrates that high reaction temperatures and reaction conversions can be achieved using concentrated sunlight while preventing wall deposition on the protective quartz tube.

EXAMPLES 26 AND 27 (Dry Reforming)

The apparatus of Examples 24 and 25 was used. During this experiment, the annular argon "purge" flow rate was 2 SLM. The reactant gas was comprised of 0.90 mole % $CH_4$ (0.2 SLM of 10 mole % $CH_4$ in argon) and 0.45 mole % carbon dioxide ($CO_2$; 0.01 SLM of dry $CO_2$). A gas sample was taken downstream prior to solar-thermal heating and analyzed using a GC. The measured composition of 0.45 mole % $CO_2$ and 0.84 mole % $CH_4$ with the balance consisting of argon indicated a feed molar composition of $CH_4$ to $CO_2$ in the ratio 1.87/1. Hence, both reaction (2) (dry $CO_2$ reforming of $CH_4$) and reaction (1) ($CH_4$ dissociation) will occur at high solar-thermally driven temperatures. The reactor was heated to a temperature of 1645° K using a solar-flux of 1500 $kW/m^2$ (Example 26). Carbon black was collected downstream after the run indicating that reaction (1) took place. The downstream product gas (analyzed by GC) was comprised of 0.23 mole % $CO_2$, 0.20 mole % $CH_4$, 0.35 mole % CO, and 1.55 mole % $H_2$, corresponding to a $CO_2$ conversion to CO of approximately 49%. The experiments were repeated, but with a solar-flux of 2000 $kW/m^2$ heating the reaction tube to a temperature of 1795° K (Example 27). A GC analysis of the collected product gas indicated a composition of 0.11 mole % $CO_2$, 0.07 mole % $CH_4$, 0.62 mole % CO, and 1.60 mole % $H_2$, corresponding to a $CO_2$ conversion to CO of approximately 76%. The fact that large concentrations of $H_2$ were measured indicates that a significant amount of the excess $CH_4$ fed according to reaction (2) dissociated according to reaction (1). Carbon black was found in the collection dust filter to further substantiate this observation.

This set of examples illustrate that concentrated sunlight can be used to carry out dry $CO_2$ reforming of $CH_4$ reactions (reaction 2) in short residence time (fractions of a second) solar-thermally heated transport graphite reaction tubes.

EXAMPLE 28 (Secondary Concentrator, Ultra-High Temperature)

A secondary concentrator was designed to deliver 7400 Watts of solar-thermal power to the hot zone (9 cm long) of a 25 mm outside diameter graphite tube enclosed by a 51 mm outside diameter quartz tube. A schematic of the secondary concentrator surrounding the reactor tube is shown in FIG. 5. The process gas out of the graphite reaction tube was isolated from the gas space in the annular region between the graphite tube and the surrounding quartz protection tube. Nitrogen gas flowed through the annular region at a rate of 1 SLM. Pure methane gas was fed to the inlet of the graphite tube at the rate of 5 SLM. An optical pyrometer measured the temperature of the outside wall of the graphite tube as 2400° K. The residence time of the gases in the hot zone of the reaction tube was approximately 0.01 second. The reacted process gas was analyzed downstream of the reactor using a thermal conductivity detector and was found to be essentially pure hydrogen ($H_2$). Carbon black was collected in a downstream filter. The carbon black particles were generated in-situ and provided radiation coupling heat transfer from the radiating wall of the reaction tube to heat the methane to dissociation temperatures and to drive the dissociation reaction to completion.

This example demonstrates that ultra-high temperatures can be achieved using concentrated sunlight and that these temperatures are high enough to drive methane dissociation reaction (1) to completion in one one-hundredth of a second residence time. Furthermore, heat absorbing particles are generated in-situ and don't need to be fed to the reactor.

What is claimed is:

1. A method for carrying out an environmentally benign high temperature chemical reaction to produce $H_2$ or synthesis gas for use as a "clean fuel", comprising:
   a) providing heat absorbing particles flowing in a gas stream comprising at least one reactant gas;
   b) heating said heat absorbing particles by direct solar thermal heating;
   c) allowing the hot particles to transfer heat to said flowing gas stream and heating said gas to a sufficiently elevated temperature for a sufficient residence time to carry out said reaction; wherein said chemical reaction is a dissociation reaction or reforming reaction.

2. The method of claim 1, wherein said dissociation reaction dissociates natural gas to produce hydrogen gas, carbon, and residual hydrocarbon species.

3. The method of claim 2 wherein the carbon particles are amorphous and have particle sizes between 20 to 40 nanometers.

4. The method of claim 1, wherein said dissociation reaction dissociates hydrogen sulfide to produce hydrogen and sulfur.

5. The method of claim 1, wherein said reforming reaction reforms natural gas with carbon dioxide to produce a synthesis gas mixture of hydrogen and carbon monoxide.

6. The method of claim 1 wherein said absorbing particles comprises carbon; and wherein said carbon particles are generated by decomposition of acetylene or natural gas.

7. The method of claim 6 wherein said carbon particles are generated in-situ by the reaction.

8. The method of claim 1 wherein said process is carried out in an aerosol tube having a non-transparent wall section and a transparent or semi-transparent wall section; wherein said solar thermal heating enters the aerosol tube from the transparent or semi-transparent section of the tube; and wherein the non-transparent section of the aerosol tube is coated with a reflective material to maintain concentrated sunlight within said tube.

9. The method of claim 8 wherein said aerosol tube comprises material selected from graphite, quartz, and combinations thereof.

10. The method of claim 8 wherein said aerosol tube comprises inner graphite tube within an outer tube oriented in a concentric arrangement, and wherein said outer tube is at least partially transparent.

11. The method of claim 8 wherein said aerosol tube comprises inner graphite tube within an outer tube in a concentric arrangement, and wherein said outer tube comprises quartz or a transparent window.

12. The method of claim 8 wherein said transparent wall section has a circular spot, a concentric cylinder, or linear slot shape along the is of the aerosol tube.

13. The method of claim 1 wherein said elevated temperature is in the range of 500° K. to 3000° K.

14. The method of claim 13 wherein said elevated temperature is 2300° K.

15. The method of claim 1 wherein the absorbing particles are heated within an internal graphite tube by solar thermal radiation.

16. The method of claim 1 wherein said chemical reaction produces hydrogen gas.

17. The method of claim 1 wherein said as stream further comprises a product of said reaction.

18. The method of claim 1 wherein said stream comprises at least one component selected from the group consisting of methane, hydrogen, hydrogen sulfide, carbon monoxide, carbon dioxide, and water vapor.

19. The method of claim 1 wherein said heating rate is in the range of 1,000° K./second to 100,000,000° K./second.

20. The method of claim 1 wherein said residence time is 0.001 to 10 seconds.

21. The method of claim 20 wherein said residence time is 0.01 to approximately 0.64 seconds.

22. A method of carrying out a high temperature chemical reaction in a graphite transport tube comprising the steps of:

providing heat absorbing particles flowing in a gas stream comprising at least one reactant gas;

heating said heat absorbing particles by solar-thermal heating;

allowing the hot particles to transfer heat to said flowing gas stream and heating said gas to a sufficiently elevated temperature and for a sufficient residence time to carry out said reaction; wherein the said residence time is 0.001 to 1 seconds and the elevated temperature is in the range of 1500 K. to 1400K.

23. A method for carrying out an environmentally benign high temperature chemical reaction to produce $H_2$ or synthesis gas for use as a "clean fuel", comprising:

a) providing heat absorbing particles flowing in a gas stream comprising at least one reactant gas;

b) heating said heat absorbing particles by direct solar thermal heating;

c) allowing the hot particles to transfer heat to said flowing gas stream heating said gas to a sufficiently elevated temperature for a sufficient residence time to carry out said reaction; wherein said chemical reaction is a reduction reaction.

24. The method of claim 23, wherein said reduction reaction reduces water vapor with carbon to produce a synthesis gas mixture of hydrogen and carbon monoxide.

* * * * *

UNITED STATES PATENT AND TRADEMARK OFFICE
CERTIFICATE OF CORRECTION

PATENT NO. : 6,872,378 B2
DATED : March 29, 2005
INVENTOR(S) : Weimer et al.

It is certified that error appears in the above-identified patent and that said Letters Patent is hereby corrected as shown below:

Column 14,
Line 6, change "1500 K to 1400 K" to read -- 1500 K to 2400 K. --

Signed and Sealed this

Seventh Day of June, 2005

JON W. DUDAS
*Director of the United States Patent and Trademark Office*